_United States Patent_ [15] 3,663,252
Stiglitz et al. [45] May 16, 1972

[54] METHOD FOR STABILIZING ALUMINOUS CEMENTS AND CEMENTS OBTAINED

[72] Inventors: Paul Stiglitz, Buisson; Gerard Sadran; Henri De Saint-Chamant, both of Paris, all of France

[73] Assignee: Societe Anonyme Ciments Lafarge, Paris, France

[22] Filed: July 24, 1968

[21] Appl. No.: 747,100

[30] Foreign Application Priority Data

July 31, 1967 France....................................166377
July 31, 1967 France....................................166378

[52] U.S. Cl.............................................106/104, 106/315
[51] Int. Cl. ...........................................C04f 7/32
[58] Field of Search ....................................106/104, 315, 89

[56] References Cited

UNITED STATES PATENTS

| | | | |
|---|---|---|---|
| 1,966,864 | 7/1934 | Knibbs | 106/104 |
| 2,845,360 | 7/1958 | King et al | 106/104 |
| 2,912,341 | 11/1959 | Ricker | 106/104 |
| 3,147,129 | 9/1964 | Armstrong et al. | 106/104 |
| 3,215,549 | 11/1965 | Ericson | 106/104 |
| 3,433,657 | 3/1969 | Pickering | 106/104 |
| 2,684,913 | 7/1954 | West | 106/89 |
| 1,852,595 | 4/1932 | Steinow | 106/89 |

*Primary Examiner*—Tobias E. Levow
*Assistant Examiner*—W. T. Scott
*Attorney*—Brumbaugh, Graves, Donohue & Raymond

[57] ABSTRACT

A process for the stabilization of aluminous cements is disclosed wherein a substance is added to the anhydrous cement mixture to prevent the formation of cubic aluminate and free water in the cement. Substances capable of forming alkaline earth carbonates, or hydroxy carbonates or precursors thereof, the natural and synthetic calcium borates, organic complexing agents for aluminum, diamino-benzene, and o-aminophenol and ethers, esters, ammonium salts and anhydrides of the complexing agents, diamino-benzene, and o-aminophenol may be used. The amount of carbonate-containing or carbonate-forming substance which is added should be sufficient to correspond to an addition of alkaline earth carbonate of about 10 percent by weight based upon cement. The amount of calcium borates which may be added ranges from 2 percent to 5 percent and the amount of organic complexing agent, diaminobenzene and o-aminophenol or the respective ether, ester, ammonium salt or anhydride which are added should be about 0.1 percent to 0.5 percent.

5 Claims, No Drawings

METHOD FOR STABILIZING ALUMINOUS CEMENTS AND CEMENTS OBTAINED

The invention relates to a method for the stabilization of aluminous cements as well as to the applications of these stabilized cements, and further relates to the stable aluminous cements thus obtained and their various applications, in particular, to aluminous concretes and mortars prepared from these cements.

As opposed to Portland cements which consist mainly of calcium silicates, aluminous binders essentially comprise anhydrous calcium aluminates, mixed with a given quantity of silicates, silico-aluminates, alumino-ferrites and calcium ferrites, which vary with the grade of raw materials used for their manufacture.

They differ from the former by their very fast hardening rate, following a normal set, and by an excellent resistance to aggressive waters, due to the fact that their hydration does not lead to the formation of calcium hydroxide, $Ca(OH)_2$. Furthermore, certain grades, of low iron content, show very good heat-proof characteristics (called refractoriness).

Hydration of anhydrous calcium aluminates, which make up the most hydraulically active part of these binders, leads to the formation of hydrated calcium aluminates, this formation being finally responsible for set and hardening of cements of this type.

Study of the representative diagram of the $CaO—Al_2O_3—H_2O$ system shows that the only stable phases appearing in this system are hydrated lime or calcium hydroxide, $Ca(OH)_2$, hydrated alumina, or aluminum hydroxide, $Al(OH)_3$, as gibbsite, and hydrated tricalcium aluminate or cubic aluminate, whose formula has been given as $3CaO·Al_2O_3·6H_2O$. As matter of fact, studies made by applicant have shown that the exact formula of this compound actually is $Ca_3[Al(OH)_6]_2$. Therefore, it is not a hydrate, but a hydroxide, and more specifically a hydroxy aluminate which differentiates it, on the one hand, from other hexagonal or pseudo-hexagonal hydrated calcium aluminates and, on the other hand, puts it logically in the same category as the other previously mentioned stable phases $Ca(OH)_2$ and $Al(OH)_3$ which are hydroxides as well.

The other above-mentioned hexagonal or pseudo-hexagonal hydrated aluminates are: hydrated monocalcium aluminate $CaO·Al_2O_3·7—10 H_2O$, hydrated dicalcium aluminate, $2CaO·Alb2O_3·8H_2O$ and hydrated tetracalcium aluminate $4CaO·Alb2O_3·13H_2O$, these various aluminates all being metastable relatively to $Ca_3[Al(OH)_6]_2$, $Ca(OH)_2$ and $Al(OH)_3$.

At temperatures below 30° C., these hexagonal aluminates are the ones forming aluminous binders through hydration. Above 30° C., and in an atmosphere of sufficiently high hygroscopy, they are converted into cubic aluminate and hydrated alumina or hydrated chalk, the rate of this conversion varying with the temperature to which they are subjected. It must be noted, moreover, that even below 30° C., hexagonal aluminates remain in a metastable state relatively to the stable phases of the $CaO—Al_2O_3—H_2O$ system, and that their conversion into cubic aluminate is normally inevitable, although it may be and is, most often, extremely slow.

This phenomenon, termed evolution of aluminous cements, occurs in all probability through redissolution of hexagonal aluminate(s) originally formed, which gives rise to the formation of a supersaturated solution as regards the stable phases $[Al(OH)_6]_2$ and $Al(OH)_3$ or $Ca(OH)_2$ and thus provokes their precipitation.

Under normal conditions of application of aluminous cements, the hydrated aluminate formed is monocalcium aluminate $CaO·Al_2O_3·7—10 H_2O$. Its conversion into cubic aluminate is shown by the following chemical equation. $3CaO·Al_2O_3·7—10 H_2O \rightarrow Ca_3[Al(OH)_6]_2 + 2 Al(OH)_3 + 9—18 H_2O$.

This conversion is accompanied by a decrease in volume of the hydrate of over 50 percent of the initial volume as well as by the appearance of a large volume of free water. As a result, if a mortar or concrete, from aluminous cement, is the seat of such an evolution, formation occurs, in the binding paste, of a certain porosity which is harmful to its mechanical properties. As a result, the mechanical strengths previously reached through formation of monocalcium aluminate, undergo a marked undesirable set-back. In addition, the evolution, once started goes to completion due to the fact that the water released favors redissolution of fresh quantities of hexagonal aluminate and its reprecipitation as cubic aluminate.

It is known that this drawback can be remedied by increasing the quantity of aluminous cement with respect to the quantity of mixing water. Indeed, under these conditions, the mixing water becomes bonded through hydration before the entire amount of anhydrous cement has come into play. Moreover, if the working conditions are such that evolution is initiated, the water formed then becomes bonded preferentially onto the excess anhydrous cement and therefore can no longer enhance the redissolution of fresh quantities of monocalcium hydrated aluminate. However, such a treatment is costly, and can lead to mortars or concretes having little plasticity which are then difficult to set into place without using special techniques such as vibration.

On the other hand, an entire series of complex aluminates is known, in which part of the lime is bonded to a mono- or divalent anion other then $Al_2O_3$. These complex aluminates are perfectly stable and are not converted into cubic aluminate. The two best known salts of this series are the hydrated calcium monocarbo-aluminate $4CaO·Al_2O_3·CO_2·11 H_2O$, and the hydrated calcium trisulfoaluminate, $6CaO·Al_2O_3·SO_332 H_2O$ or Candlot's salt. But, the monosulfo and tricarbo-aluminates are also known, as well as the chloro, -bromo, -iodo, -nitro, aceto, -mangano and tungstoaluminates.

Applicant then tried to prevent in a very simple manner, this evolution of hexagonal aluminates into cubic aluminate when these are subjected to the usual working conditions of aluminous cements, possibly even at temperatures of up to 50° to 70° C. It was thought, and investigations and tests carried out in this direction have shown the exactness of this hypothesis and its favorable industrial consequences, that it might be possible through certain additions to enhance setting into place of concretes and mortars for which the water/cement ratios, are low and to prevent said evolution.

In a first series of investigations, applicant has noted that an addition of calcium carbonate caused the formation of monocarboaluminate. However, this reaction is very slow. It can be observed, for example, after a certain period of conservation, in concretes from aluminous cements whose aggregates are chalky, and only on the periphery of the latter. It also occurs through action of atmospheric carbon dioxide, but, although faster than in the preceding case, the reaction, however, remains limited to the shallow parts of the mortar and concrete and, in addition, is unusable in practice. It was then noted, by applicant, that the addition to aluminous cement, of magnesium carbonate or of a magnesium-rich limestone (dolomite or dolomitic limestone), crushed to a sufficient fineness caused, upon hydration of the latter, a rapid appearing of a carboaluminate very similar to the precipitated calcium monocarboaluminate, but in which it must be assumed that a part of the calcium was replaced by magnesium and which can therefore be expressed by the formula $(CaO·MgO)_4·Al_2O_3·CO_2·11 H_2O$ for it was noted that the addition of a higher quantity than that corresponding to the stoichiometric ratio, leads to the formation of calcite, $CaCO_3$, besides the complex aluminate. This aluminate does not evolve at temperatures above 30° C. at which, however, the conversion of hexagonal aluminate into cubic aluminate is normally observed.

A second series of investigations has shown, furthermore, that the addition of organic compounds, which, in general, are complexing agents for aluminum ion, enhance the growth of calcium aluminate crystals. It may be assumed either that they slightly increase their water solubility and therefore cause a slowing down in their precipitation which leads to more perfectly formed crystals, or that they increase the solubility of hydrated alumina which appears simultaneously with the aluminates, thus hindering redissolution of hexagonal aluminates and as a result, their conversion into cubic aluminate, or still and even very probably, that these two phenomena are superimposed, thus adding their effects.

A third series of investigations has led to the observation that the same results could be obtained by adding, to the anhydrous aluminous cements, natural or synthetic calcium borates which seem to form boro-aluminates with the aluminate.

From these teachings, observations and results of the above investigations, the process for stabilization of aluminous cements consists fundamentally, according to the invention, in incorporating at least one of the compounds adapted to prevent the formation of cubic aluminate and loss of strength chosen among substances capable of forming carbonates or substances containing magnesium carbonate or hydroxycarbonate or still, organic substances which are, in general, complexing agents for aluminum ion, or finally natural or synthetic calcium borates.

As inorganic substances, magnesium carbonate, or dolomite or dolomitic limestones may be used in proportions such that the addition corresponds to an addition of magnesium carbonate, $MgCO_3$, of approximately 10 percent by weight based on cement, or still 2 to 5 percent of calcium borates.

As organic substances usable according to the invention, the following, among others, may be mentioned:

complexing agents for aluminum such as aurin-tricarboxylic acid,
salicylic acid, and
pyrocatechol,
products, which, under certain conditions, may act as complexing agents for aluminum: phthalic acid, naphthenic acid, and dinaphthol,
non-complexing agents: diaminobenzene, o-aminophenol.

Moreover, it is to be noted that, individual tests previously realized in the laboratory to determine for each addition its optimal conditions of use any organic substance may be conveniently used, which possesses one or more benzene rings, either separated, or bounded as naphthenic or anthracenic groups, and carrying phenol (—OH), carboxylic (—COOH) or amino($NH_2$) functional groups, preferably in the ortho position or in the case of more complex rings, in corresponding positions, or, at least sufficiently close to act in a similar manner, whereby said rings may carry either two identical groups or two different groups selected from those indicated above.

Ethers, esters, ammonium salts, anhydrides or hydrochlorides of the above mentioned products also lead to the desired results according to the invention. The quantity of organic substance added is advantageously of the order of 0.1 to 0.5 percent by weight based on cement. The addition may be carried out either as a solution in a suitable organic solvent, before or after crushing, or as an addition to the mixing water upon application of the aluminous binder in the form of concrete or mortar.

It is also possible, according to the invention, to introduce carbon dioxide ($CO_2$) into the concrete mixers where the aluminous cements are converted. The proportion of carbon dioxide must be 3.5 percent by weight based on cement, measured at normal pressure and temperature.

The additions according to the invention, substantially improve the plasticity of mortars and concretes from aluminous cements and lead to their setting into place at low water/cement ratios, i.e. lower than 0.3. When the addition to the aluminous cements ranges from 4 to 5 percent of calcium borate, with normal water/cement ratios of 0.4 to 0.5, there is a marked increase in the strengths of said cements, in particular the compressive strength, when they are hydrated at room temperature, the hydrate formed being mainly hydrated monocalcium aluminate $CaO \cdot Al_2O_3 \cdot 7-10\ H_2O$.

The aluminous cements treated according to the invention provide concretes and mortars with good keeping characteristics up to 50°–55° C. in the case of addition of organic materials and even up to 70° C. in the case of addition of inorganic materials. In all cases, the mechanical strength of concretes and mortars from aluminous cements is by far superior to that of a mortar or concrete from an aluminous cement without addition and having undergone the same heat treatment.

It thus becomes possible to concrete without taking the generally recommended precautions, i.e. stripping as soon as possible and cooling by spraying water.

It has been noted that the treatment according to the invention can sometimes slow down setting, in particular, at temperatures below 30° C. when adding inorganic materials and when using rates of addition or organic materials substantially higher than 0.5 percent. This slowing down of setting is eliminated or decreased by adding to the cement, a certain proportion, advantageously of the order of 0.10 percent by weight based on cement, of a setting accelerator such as $Li_2CO_3$, possibly complemented by sodium citrate, in a proportion of approximately 0.20 percent by weight based on cement, the purpose of the sodium citrate being to prevent stiffening caused by the accelerator.

What we claim is:

1. A process for the stabilization of aluminous cements by preventing the formation of cubic aluminate and water in the cement comprising adding to the anhydrous cement from about 2 percent to 5 percent of the natural and synthetic calcium borates based upon the weight of cement.

2. Process according to claim 1, in which setting accelerator is added.

3. Process according to claim 2 in which the setting accelerator is $Li_2CO_3$ applied in the proportion of approximately 0.10 percent by weight, based on the cement.

4. Process according to claim 2 in which about 0.21 percent of sodium citrate by weight, based on cement, is added to the accelerator.

5. Product of the process of claim 1.

* * * * *

PO-1050
(5/69)

UNITED STATES PATENT OFFICE
CERTIFICATE OF CORRECTION

Patent No. 3,663,252                    Dated May 16, 1972

Inventor(s) Paul Stiglitz et al.

It is certified that error appears in the above-identified patent and that said Letters Patent are hereby corrected as shown below:

Page 1, Assignee "Ciements" should read --Ciments--;

Page 1, Application Priority Data, "166377" and "166378" should read --116,377-- and --116,378--, respectively;

Page 1, U.S. References Cited, "Steinow" should read --Steinour--;

Page 1, Abstract, line 8, "o-aminophenol and ethers" should read --o-aminophenol and the ethers--;

Col. 1, lines 44, 45, "hydrated dicalcium aluminate, $2CaO \cdot Alb2O_3 \cdot 8H_2O$" should read --hydrated dicalcium aluminate, $2CaO \cdot Al_2O_3 \cdot 8H_2O$--;

Col. 1, lines 45 and 46, "$2CaO \cdot Alb2O_3 \cdot 8H_2O$" and "$4CaO \cdot Alb2O_3 \cdot 13H_2O$" should read --$2CaO \cdot Al_2O_3 \cdot 8H_2O$-- and "$4CaO \cdot Al_2O_3 \cdot 13H_2O$--, respectively;

Col. 2, lines 29, 30, "$6CaO \cdot Al_2O_3 \cdot SO_332H_2O$" should read --$6CaO \cdot Al_2O_3 \cdot SO_3 \cdot 32H_2O$--;

Col. 2, line 30, "monosulfo and" should read --monosulfo- and--.

Signed and sealed this 17th day of April 1973.

(SEAL)
Attest:

EDWARD M. FLETCHER, JR.                    ROBERT GOTTSCHALK
Attesting Officer                          Commissioner of Patents